(12) United States Patent
Matsuo et al.

(10) Patent No.: US 8,179,301 B2
(45) Date of Patent: May 15, 2012

(54) IMAGE PROCESSOR AND IMAGE PROCESSING METHOD FOR SYNTHETIC APERTURE RADAR

(75) Inventors: Shingo Matsuo, Tokyo (JP); Hitoshi Nohmi, Tokyo (JP)

(73) Assignee: NEC Corporation, Tokyo (JP)

( * ) Notice: Subject to any disclaimer, the term of this patent is extended or adjusted under 35 U.S.C. 154(b) by 1426 days.

(21) Appl. No.: 11/785,662

(22) Filed: Apr. 19, 2007

(65) Prior Publication Data

US 2007/0268305 A1    Nov. 22, 2007

(30) Foreign Application Priority Data

May 18, 2006   (JP) .................................. 2006-139102

(51) Int. Cl.
*G01S 13/90* (2006.01)
*G01S 13/00* (2006.01)

(52) U.S. Cl. .................. 342/25 D; 342/25 R; 342/25 A; 342/25 F; 342/175; 342/195

(58) Field of Classification Search ....... 342/25 R–25 F, 342/175, 176, 179, 192–197, 21, 22, 82–103, 342/159–164
See application file for complete search history.

(56) References Cited

U.S. PATENT DOCUMENTS

| | | | | |
|---|---|---|---|---|
| 4,707,697 A | * | 11/1987 | Coulter et al. ............... | 342/25 A |
| 5,021,789 A | * | 6/1991 | Shaw .......................... | 342/25 E |
| 5,448,241 A | * | 9/1995 | Zeoli et al. .................. | 342/25 A |
| 5,666,121 A | * | 9/1997 | Fang et al. .................. | 342/25 A |
| 5,708,436 A | * | 1/1998 | Loiz et al. ................... | 342/25 A |
| 5,900,833 A | * | 5/1999 | Sunlin et al. .................... | 342/22 |
| 6,018,306 A | * | 1/2000 | Serbin ......................... | 342/25 A |
| 6,255,981 B1 | * | 7/2001 | Samaniego ................ | 342/25 R |
| 6,608,585 B2 | * | 8/2003 | Benitz ......................... | 342/25 R |
| 6,965,341 B1 | * | 11/2005 | Cho et al. .................... | 342/25 A |
| 7,106,243 B2 | * | 9/2006 | Krikorian et al. ........... | 342/25 B |
| 7,701,383 B2 | * | 4/2010 | Blumling ....................... | 342/89 |
| 2003/0071750 A1 | * | 4/2003 | Benitz ............................. | 342/25 |
| 2006/0109162 A1 | * | 5/2006 | Krikorian et al. ........... | 342/25 B |

FOREIGN PATENT DOCUMENTS

| | | |
|---|---|---|
| JP | 4-248488 (A) | 9/1992 |
| JP | 5-61963 (A) | 3/1993 |
| JP | 09-081756 | 3/1997 |
| JP | 11-281739 (A) | 10/1999 |
| JP | 2000-249527 A | 9/2000 |
| JP | 2001-194455 (A) | 7/2001 |

* cited by examiner

*Primary Examiner* — Bernarr Gregory
(74) *Attorney, Agent, or Firm* — Foley & Lardner LLP

(57) ABSTRACT

An image processor and an image processing method for a synthetic aperture radar searching for a target are provided. A high resolution processing unit performs high resolution processing up to an area equivalent to a small target or smaller to thereby acquire information held by the small target. Next, a maximum value filter processing unit develops the information of the small target acquired through the high resolution processing in one pixel of low resolution processing with a maximum value. Then, a display unit displays the minimum area of the low resolution processing as one pixel on a screen. Since the information originally held by the small target can be displayed without damaging it as described above, it is easily distinguishable from the background information, enabling to improve the detection capability as a radar.

6 Claims, 10 Drawing Sheets

A1 AREA WHERE SMALL　　A2 AREA WHERE SMALL
TARGET IS PRESENT　　　　TARGET IS NOT PRESENT

3 DISPLAY UNIT

2 MAXIMUM VALUE FILTER PROCESSING UNIT

IMAGE PROCESSOR AND IMAGE PROCESSING METHOD FOR SYNTHETIC APERTURE RADAR

BACKGROUND OF THE INVENTION

1. Field of the Invention

The present invention relates to an image processor and an image processing method for a synthetic aperture radar capable of displaying information originally held by a small target without damaging it.

2. Description of Related Art

Conventionally, a method disclosed in Japanese Patent Application Laid-Open No. 2000-249527 (Patent Document 1) has been used for performing image processing. In the method, a low resolution processing unit performs thinning out to a digital conversion image so as to express the image feature amount with low resolution, and a high resolution processing unit does not perform thinning out to the digital conversion image so as to express the image feature amount with high resolution.

Further, Japanese Patent Application Laid-Open No. 09-081756 (Patent Document 2) discloses art including a maximum value filter, a minimum value filter and a subtractor, as level extraction filters. In the maximum value filter, the maximum value of the pixel level of each pixel of a prescribed pixel length, which is a filter length of before and after the target pixel along the image scanning axis, is set as a value of the target pixel. In the minimum value filter, the minimum value of the pixel level of each pixel of a filter length in right and left of the target pixel is set as a value of the targeted value, from the output image of the maximum value filter. In the subtractor, an input image is subtracted from the output image of the minimum value filter, whereby only levels not more than the prescribed pixel length are extracted from the input image. By combining these techniques, it can be considered to process a sea surface image.

However, as shown in FIG. 8, a conventional synthetic aperture radar image display has the following problem. That is, in order to monitor a wide area, if processing is performed with low resolution by a low resolution processing unit 20 and the image signal processed with the low resolution is displayed by a display unit 21, the signal energy of a target smaller than one pixel size when imaged is averaged in one pixel. Therefore, it is difficult to distinguish it from the energy of sea clutter, causing a problem in detecting capability.

In other words, in the case of performing low resolution processing, signal to noise ratio (S/N) of a target is lowered due to a decrease in T*B relating to the Doppler band B and the observation time T. Besides, since the observation time T is short, sea clutter suppressing capability is also lowered.

Further, as shown in FIG. 9, in the case of processing with high resolution by a high resolution processing unit 22 and displaying the image signal processed with the high resolution by the display unit 23, the signal energy of the target can be easily distinguished from the energy of sea clutter. However, in order to monitor a wide area, a large high-definition display, displaying all pixels, is needed. Therefore, it is required to realize target detecting capability same as that of the case of high resolution, even in displaying a wide area with low resolution.

SUMMARY OF THE INVENTION

It is therefore an object of the present invention to provide an image processor and an image processing method for a synthetic aperture radar searching for a target, which realize small target detection capability same as the case of imaging with high resolution even in the case of imaging with low resolution, in order to monitor a large area with a display of limited pixel size.

In order to achieve the object, an image processor of a synthetic aperture radar according to the present invention includes: a high resolution processing unit which performs high resolution processing up to an area equivalent to a small target or smaller so as to acquire information held by the small target; a maximum value filter processing unit which develops information of the small target acquired through the high resolution processing in one pixel of low resolution processing with the maximum value; and a display unit which displays the minimum area of the low resolution processing as one pixel on a screen.

According to the present invention, high resolution processing is performed up to an area equivalent to a small target or smaller by using the high resolution processing unit so as to acquire information held by the small target. Then, by using the maximum value filter, the information of the small target acquired through the high resolution processing is developed in one pixel of low resolution processing with the maximum value. Then, the display unit displays the minimum area of the low resolution processing as one pixel on the screen.

EFFECTS OF THE INVENTION

As described above, according to the present invention, the signal energy of a target processed with high resolution is contracted in the image size through a maximum value filter. Thereby, it is possible to reduce the data amount, and to display even a small target without damaging the pixel information.

DESCRIPTION OF PREFERRED EMBODIMENT

Hereinafter, an embodiment of the present invention will be described in detail based on the drawings.

Figure 1:
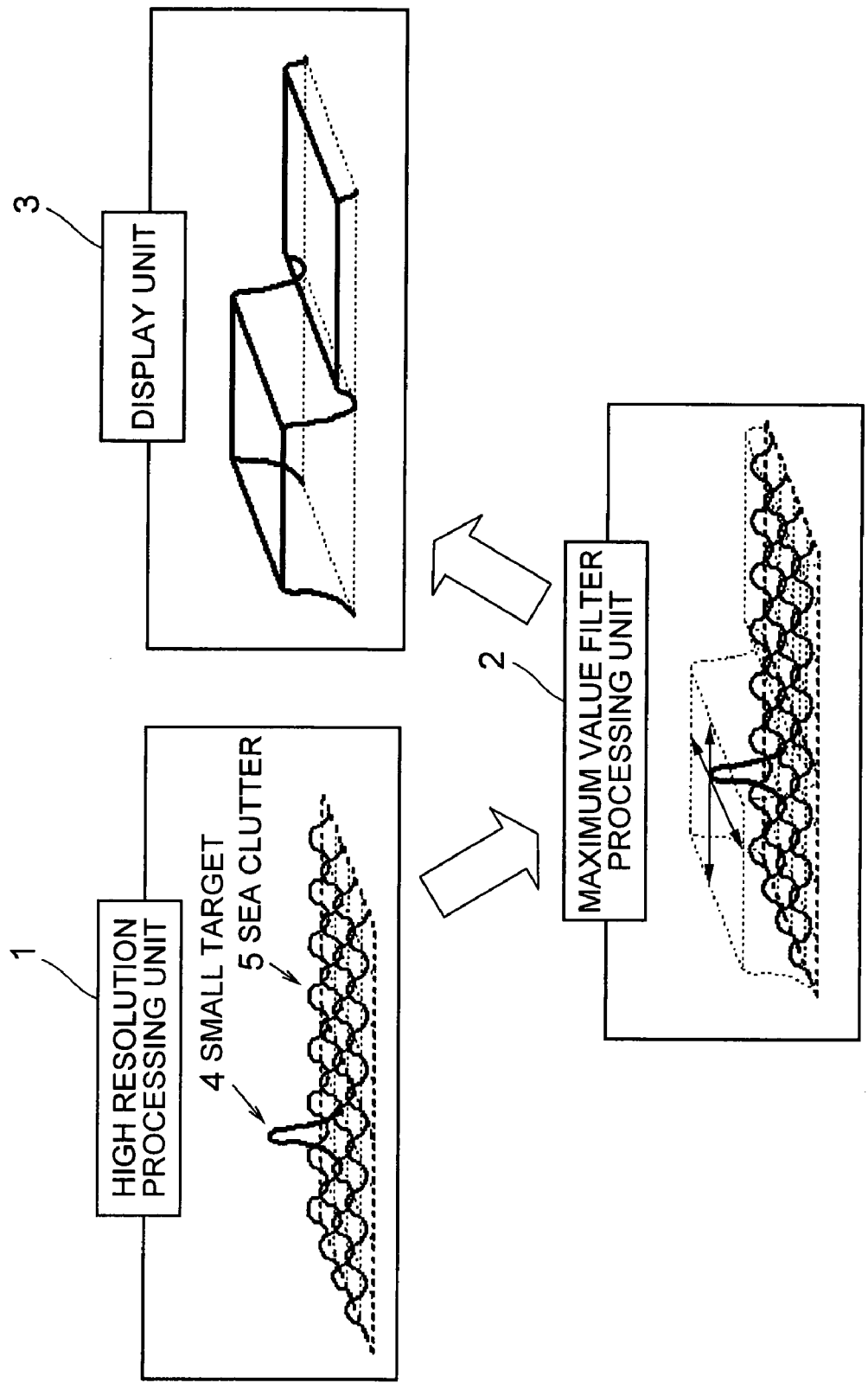
FIG. 1 is a configuration diagram showing the configuration of an image processor of a synthetic aperture radar according to an embodiment of the present invention.

As shown in FIG. 1, an image processor of a synthetic aperture radar according to the present invention includes a high resolution processing unit 1, a maximum value filter processing unit 2, and a display unit 3.

Figure 2:
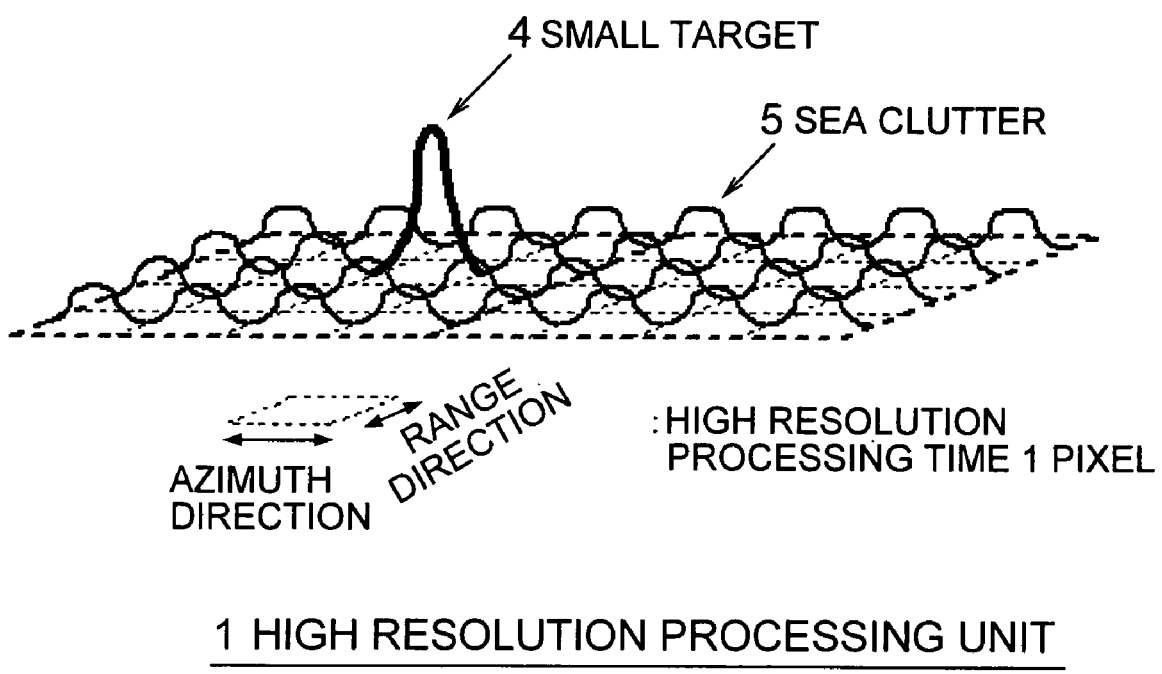
FIG. 2 is a diagram illustrating the operation of a high resolution processing unit.

As shown in FIG. 2, the high resolution processing unit 1 has a function of performing high resolution processing up to an area equivalent to a small target 4 or smaller (1 pixel) to thereby acquire information held by the small target 4.

Figure 3:
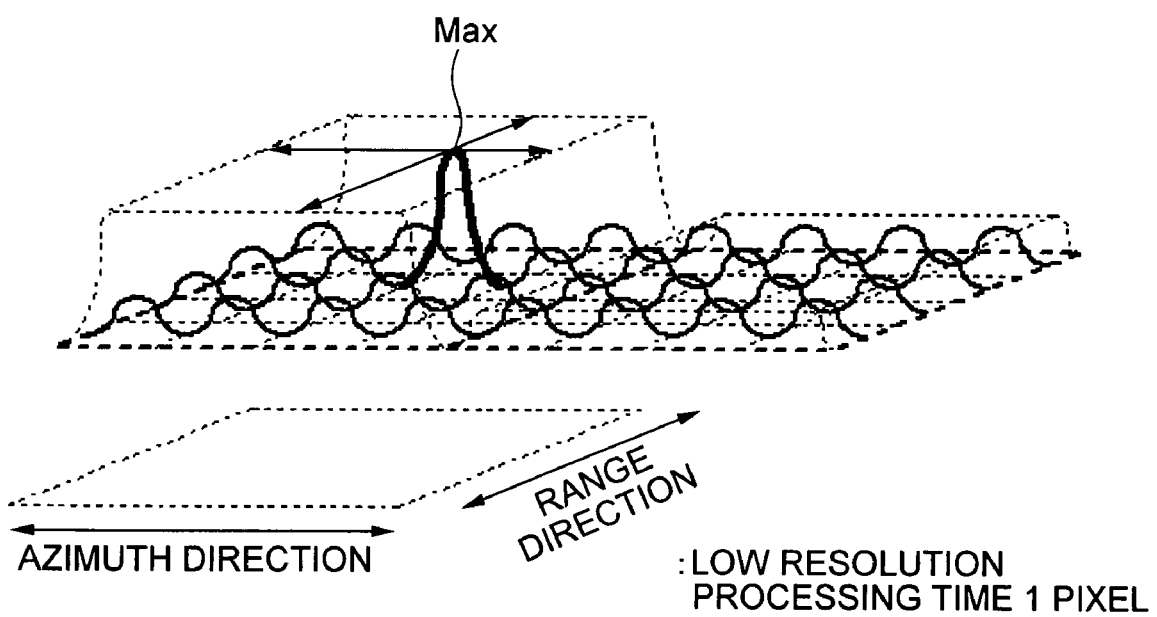
FIG. 3 is a diagram illustrating the operation of a maximum value filter processing unit.

As shown in FIG. 3, the maximum value filter processing unit 2 has a function of developing the information of the small target 4 acquired through the high resolution processing by the high resolution processing unit 1 in one pixel of low resolution processing with the maximum value. Further, the maximum value filter processing unit 2 has a function of applying the maximum value of background information 5 to an area where the small target 4 is not present.

Figure 4:
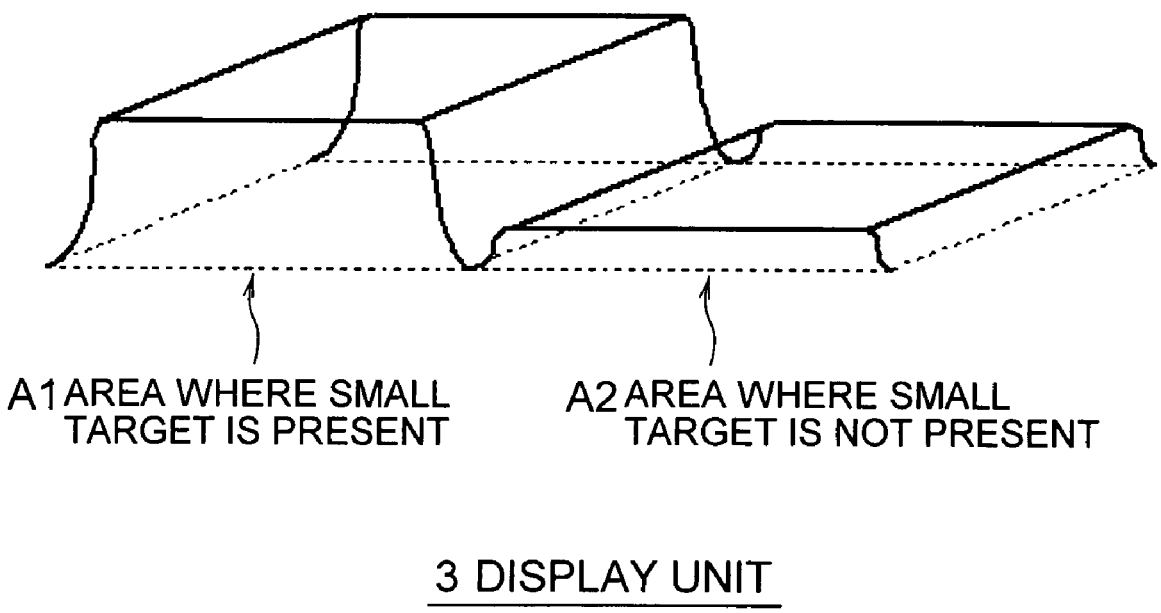
FIG. 4 is a diagram illustrating the operation of a display unit.

As shown in FIG. 4, the display unit 3 has a function of displaying the smallest area of the low resolution processing as one pixel on a screen, when receiving an output from the maximum value filter processing unit 2.

Next, description will be given in detail for an example in which an image processor of a synthetic aperture radar according to the present embodiment is applied to the case of searching for the small target 3 at sea by a radar. In the case of searching for the small target 4 at sea by a radar, the background information 5 corresponds to sea clutter.

As shown in FIG. 2, the high resolution processing unit 2 performs azimuth compression processing to thereby make the azimuth direction to have high resolution.

The Doppler band B of a signal to be inputted to the high resolution processing unit 2 shown in FIG. 2 is assumed to be large enough for high resolution. If the Doppler band B is large, the target is irradiated with a radar wave for a long time, so the observation time T of the target is also long.

With the azimuth compression performed by the high resolution processing unit 2, the signal to noise ratio (S/N) of the target 4 is improved by T*B. On the other hand, the sea clutter 5 varies during the observation time T, so the compression effect is suppressed compared with that of the target 4. Therefore, with the high resolution processing performed by the high resolution processing unit 2, even the small target 4 can be identified easily, as shown in FIG. 2.

Different from the present embodiment, if low resolution processing is performed instead of high resolution processing, S/N of the target 4 is lowered due to a decrease in T*B. Further, since the observation time T is short, the capability of suppressing the compression effect of the sea clutter 5 is also lowered. Further, in the case of the small target 4, signal energy is diffused, which makes identification of the small target 4 difficult.

Therefore, the present embodiment is on the premise of performing high resolution processing so as to keep identification of the small target 4 easy.

Figure 5:
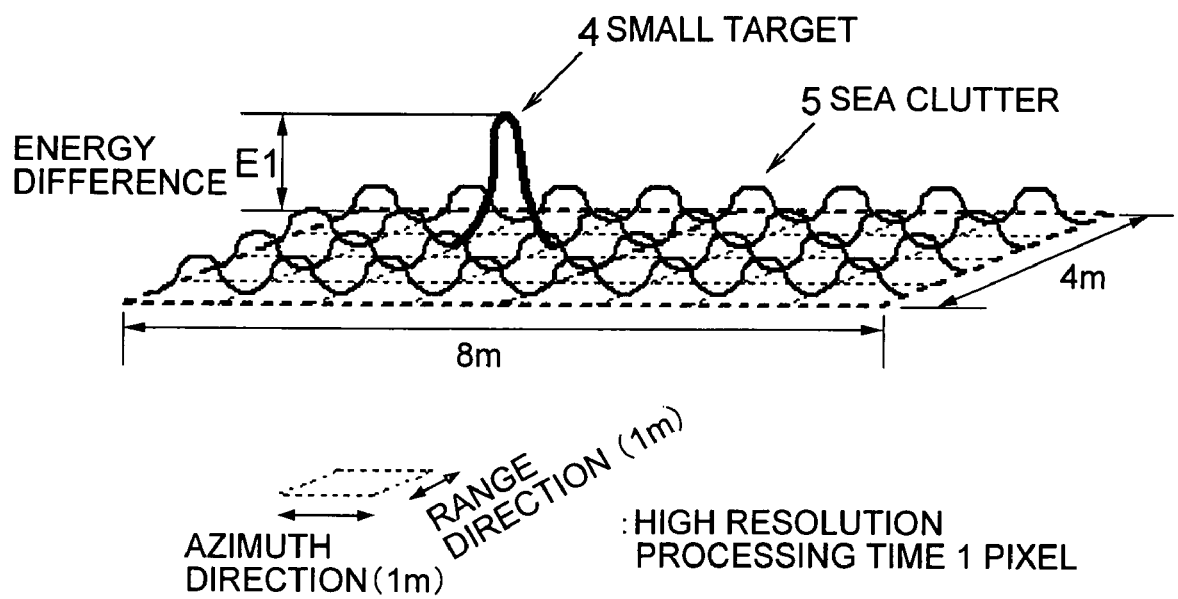
FIG. 5 is a diagram illustrating the operation of the high resolution processing unit in detail.

As shown in FIG. 5, one pixel size at the time of high resolution processing by the high resolution processing unit 1 is set to 1 m in a range direction and in an azimuth direction, respectively.

If the size of the small target 4 at sea is not less than 1 $m^2$, the high resolution processing unit 1 performs compression without damaging the signal energy of the small target 4, whereby information about the small target 4 is aggregated in one pixel size.

In the present embodiment, azimuth compression processing is performed so as to make the azimuth direction to have high resolution. Therefore, the signal energy of the sea clutter 5 is not so compressed in the azimuth direction, so the relative energy difference E1 between the small target 4 and the sea clutter 5 becomes large as shown in FIG. 5. Namely, the detection capability as a radar is in an excellent state.

In FIG. 5, assuming that the data amount for one pixel is 1, in the case of processing an area of 32 $m^2$, that is, 8 pixels (8 m) in the azimuth direction and 4 pixels (4 m) in the range direction, the data amount is 32. Note that the area of one pixel at the time of high resolution processing is not limited to that described above.

As shown in FIG. 1, the high resolution processing unit 1 performs azimuth compression processing, and outputs data in which the azimuth direction is made to have high resolution to the maximum value filter processing unit 2.

Figure 6:
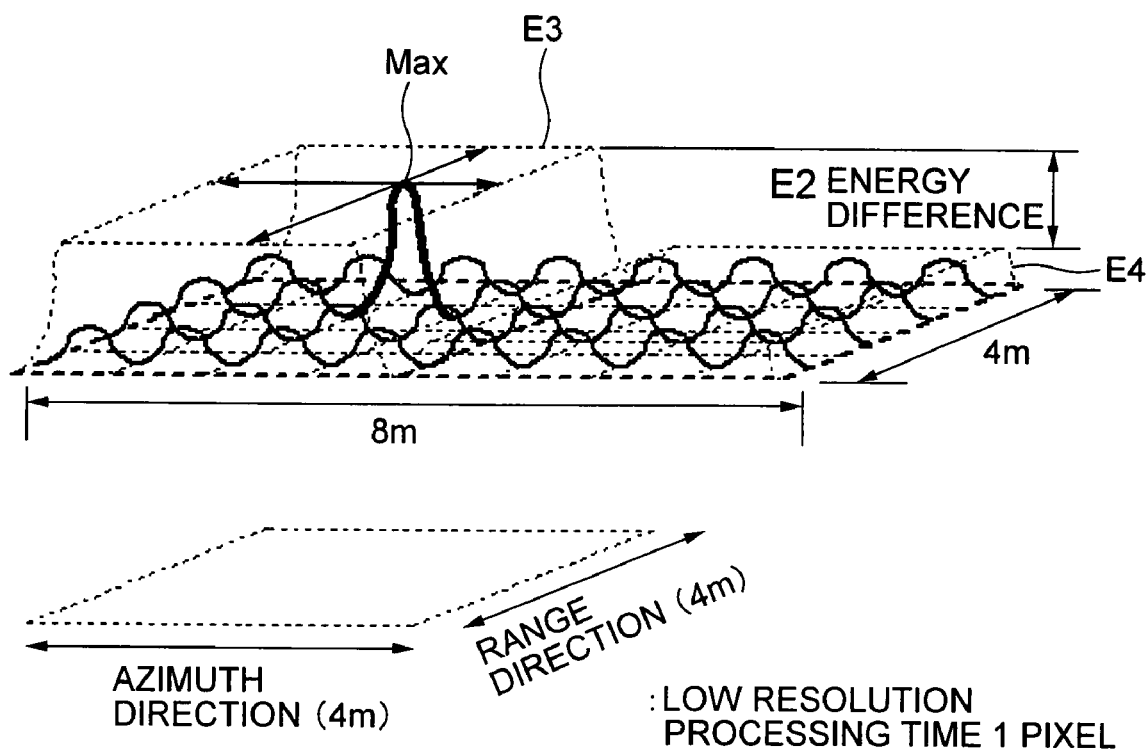
FIG. 6 is a diagram illustrating the operation of the maximum value filter processing unit in detail.

As shown in FIGS. 3 and 6, when the maximum value filter processing unit 2 receives the data after high-resolution processing processed by the high resolution processing unit 1, the maximum value filter processing unit 2 detects the maximum value Max of the data after high-resolution processing, and develops the data in one pixel of the low resolution processing. The data indicating the maximum value Max is data corresponding to the small target 4 at sea searched by the radar.

In the example shown in FIG. 6, one pixel of the low resolution processing in the maximum value filter processing unit 2 shown in FIG. 3 is set to an area of 16 $m^2$, that is, 4 pixels (4 m) in the azimuth direction and 4 pixels (4 m) in the range direction. Note that the area of one pixel at the time of low resolution processing is not limited to that described above.

As shown in FIG. 6, if the signal energy of the small target 4 compression-processed by the high resolution processing unit 1 is present in one pixel at the time of low resolution processing and the energy is the maximum in one pixel, the maximum value filter processing unit 2 applies the energy value to the whole of one pixel. The energy value E3 is shown by a dotted line in FIG. 6.

As shown in FIG. 6, if the signal energy E3 of the small target 4 compression-processed by the high resolution processing unit 1 is not present in one pixel at the time of low resolution processing, the maximum value filter processing unit 2 applies the maximum value of the signal energy E4 of the sea clutter 5 to the whole of one pixel. The energy E4 is shown by a dotted line in FIG. 6.

As shown in FIG. 6, in the case where the small target 4 is present and the energy E3 thereof is the maximum and the energy value E3 thereof is applied to the whole of one pixel, and in the case where the small target 4 is not present and the signal energy E4 of the sea clutter 5 is applied to the whole of one pixel, the relative signal energy difference E2 (E3-E4) between the small target 4 and the sea clutter 5 is kept as it is. Namely, the detection capability as a radar is kept in an excellent state even after the maximum value filter processing.

On the other hand, since the data amount for one pixel is set to 1, the data amount of the data inputted from the high resolution processing unit 1 becomes 2 as obvious from FIG. 6, which is contracted to one sixteenth.

The maximum value filter processing unit 2 outputs the data to which the maximum value filter processing has been performed, to the display unit 3 shown in FIG. 1.

Figure 7:
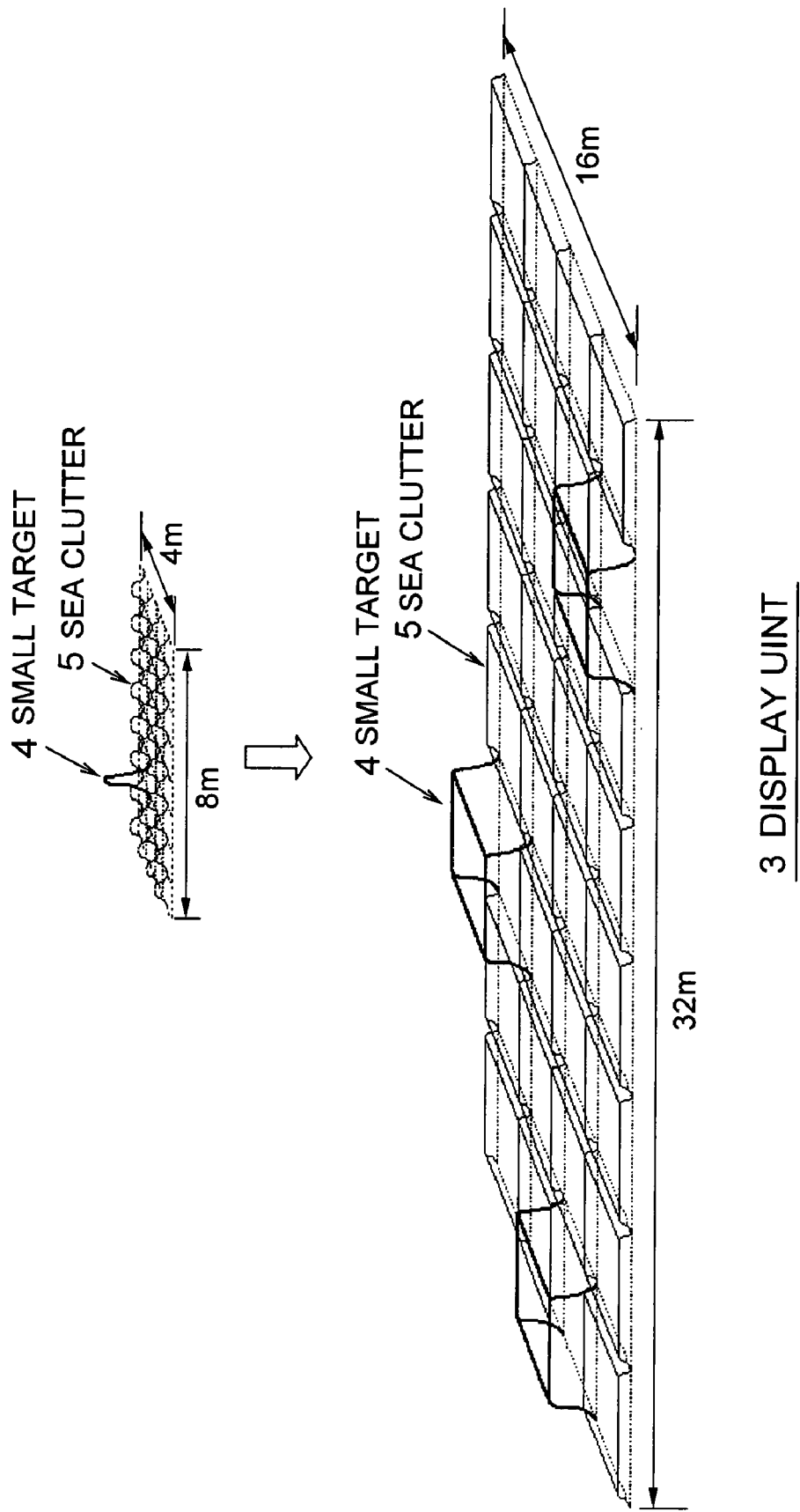
FIG. 7 is a diagram illustrating the operation of the display unit in detail.
Figure 8:
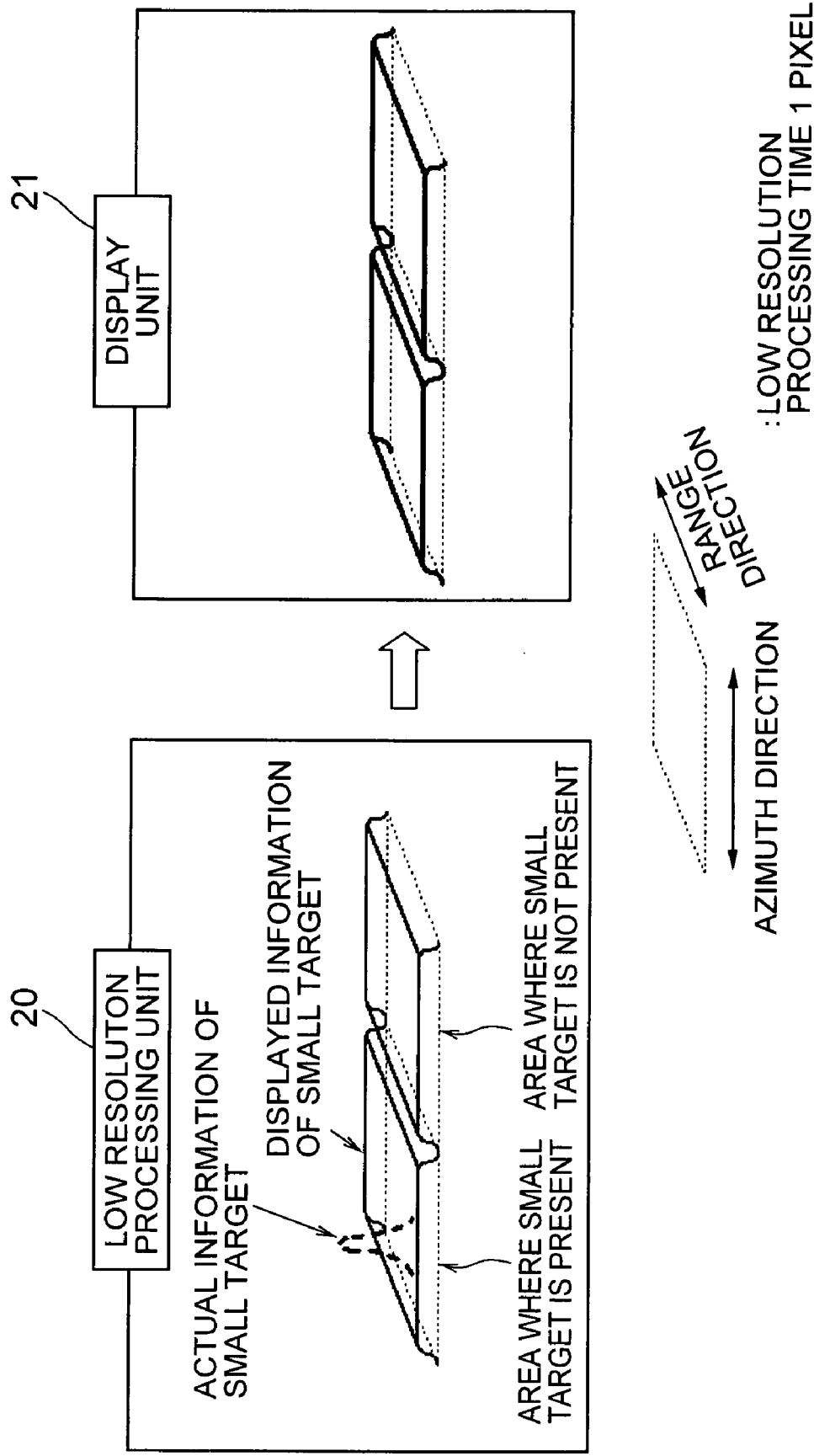
FIG. 8 is a configuration diagram showing the configuration of displaying data by performing low resolution processing in a conventional example.
Figure 9:
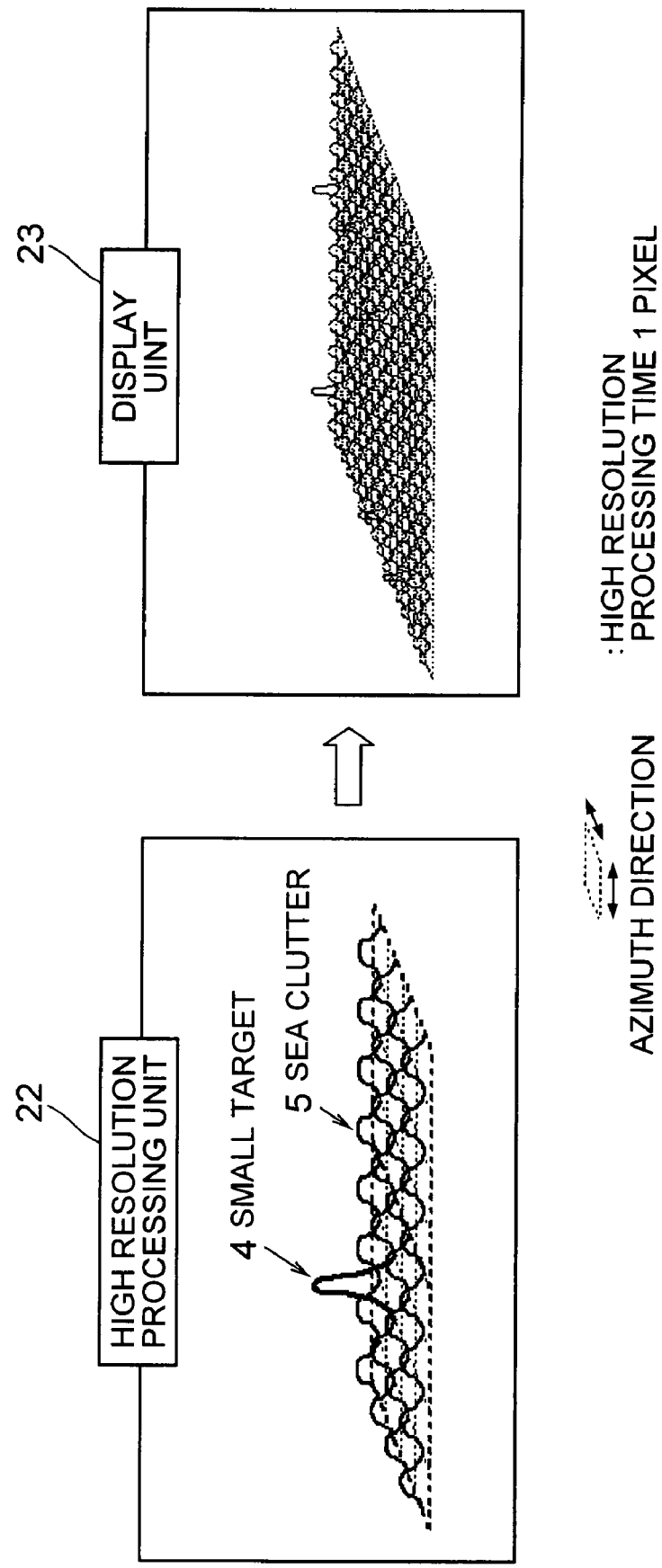
FIG. 9 is a configuration diagram showing the configuration displaying data by performing high resolution processing in a conventional example.

As shown in FIGS. 4 and 7, the display unit 3 displays one pixel of the processing, after the maximum value filter processing has been performed, as one pixel of displaying.

As shown in FIG. 4, in the data received by the display unit 3, the signal energy E3 of the area A1 where the small target 4 is present is large, and the signal energy E4 of the area A2 where the small target 4 is not present is small. Therefore, based on the difference between the signal energies E3 and E4, the display unit 3 displays the image as a difference in the luminance level, on the screen.

In other words, as shown in FIG. 4, the display unit 3 makes a pixel where the small target 4 is present bright, and makes a pixel where only the sea clutter 5 is present dark to thereby display the small target 4 and the sea clutter 5 while identifying them clearly.

When the display unit 3 displays on a screen, if the data to which the high resolution processing has been performed is displayed on the screen as it is, an area of 32 m$^2$ is displayed with the data amount 32. However, if the data to which maximum value filter processing has been performed is displayed on the screen as described in the present embodiment, an area of 16 m$^2$*32=512 m$^2$ can be displayed with the same data amount 32 as shown in FIG. 7.

Therefore, by adding the maximum value filter processing, it is possible to realize small target detection capability same as that of the time of high resolution, even in the case of imaging with low resolution in order to monitor a large area with a display of limited pixel size.

In the embodiment described above, the image processor of the synthetic aperture radar according to the present embodiment is applied in the case of detecting the small target 4 at sea by the radar. However, the present invention is not limited to this configuration. It can be widely applied in the case of processing an image searched by a synthetic aperture radar.

Figure 10:
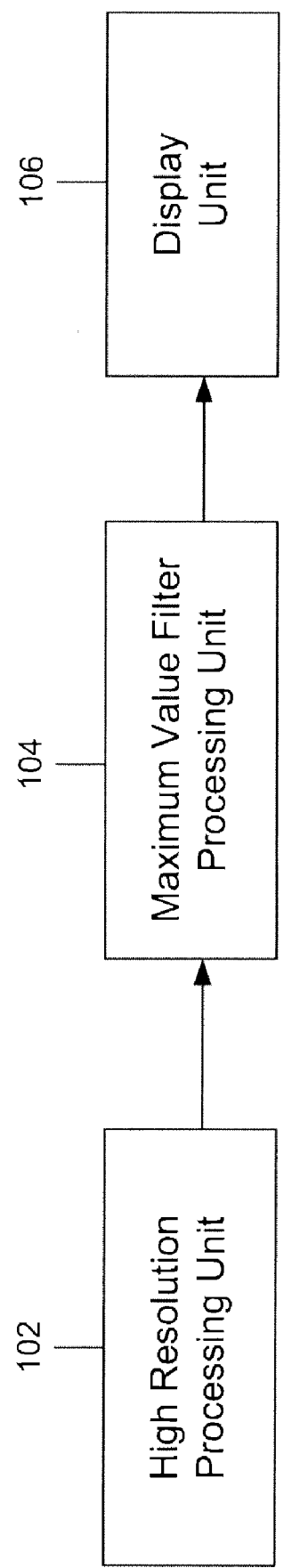
FIG. 10 is a block diagram showing a system according to an embodiment of the invention.

FIG. 10 is a block diagram showing a system according to an embodiment of the invention. As shown, a high resolution processing unit 102, which performs high resolution processing up to an area equivalent to a small target or smaller to thereby acquire information held by the small target, provides information to a maximum filter processing unit 104. The maximum filter processing unit develops information of the small target obtained through the high resolution processing unit 102 with a maximum value in one pixel of low resolution processing. A display unit 106 displays a minimum area of the low resolution processing as one pixel on a screen.

INDUSTRIAL APPLICABILITY

As described above, the present invention can display information originally held by a small target without damaging it. Thereby, identification from the background information (e.g., sea clutter) becomes easy. This enables to improve detection capability as a radar.

What is claimed is:

1. An image processor of a synthetic aperture radar, comprising:
    a high resolution processing unit which performs high resolution processing at a pixel area corresponding to or less than an area of a target to thereby acquire information held by the target;
    a maximum value, filter processing unit which develops information of the target obtained through the high resolution processing with a maximum value in one pixel of low resolution processing; and
    a display unit which displays a minimum area of the low resolution processing as one pixel on a screen.

2. The image processor of a synthetic aperture radar, according to claim 1,
    wherein the high resolution processing unit has a function of performing azimuth compression processing so as to make an azimuth direction to have high resolution.

3. The image processor of a synthetic aperture radar, according to claim 1,
    wherein the maximum value filter processing unit has a function of applying a maximum value of background information to an area where the target is not present.

4. An image processing method for a synthetic aperture radar to perform:
    high resolution processing in which high resolution processing is performed at a pixel area corresponding to or less than an area of a target to thereby acquire information held by the target;
    maximum value filter processing to develop information of the target acquired through the high resolution processing with a maximum value in one pixel of low resolution processing; and
    display processing to display a minimum area of the low resolution processing as one pixel on a screen.

5. The image processing method for a synthetic aperture radar, according to claim 4,
    wherein in the high resolution processing, azimuth compression processing is performed so as to make an azimuth direction to have high resolution.

6. The image processing method for a synthetic aperture radar, according to claim 4,
    wherein in the maximum value filter processing, a maximum value of background information is applied to an area where the target is not present.

* * * * *